(12) United States Patent
Shoji et al.

(10) Patent No.: US 7,435,975 B2
(45) Date of Patent: Oct. 14, 2008

(54) SCINTILLATOR PLATE FOR RADIATION AND RADIOGRAPHIC IMAGE DETECTOR

(75) Inventors: Takehiko Shoji, Tokyo (JP); Yasushi Nakano, Tokyo (JP); Mika Sakai, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/533,119

(22) Filed: Sep. 19, 2006

(65) Prior Publication Data

US 2007/0075254 A1   Apr. 5, 2007

(30) Foreign Application Priority Data

Sep. 30, 2005   (JP) ............................. 2005-287312

(51) Int. Cl.
*G03B 42/08* (2006.01)

(52) U.S. Cl. ............... 250/484.4; 250/367; 250/370.09; 250/370.11

(58) Field of Classification Search ................. 250/367, 250/370.11, 361 R, 484.4
See application file for complete search history.

(56) References Cited

U.S. PATENT DOCUMENTS

| 4,533,489 | A  | * | 8/1985  | Utts et al. ............... 252/301.17 |
| 6,600,158 | B1 | * | 7/2003  | Okada et al. ........... 250/370.11 |
| 6,806,473 | B2 | * | 10/2004 | Honda et al. ........... 250/370.11 |
| 7,180,068 | B1 | * | 2/2007  | Brecher et al. .......... 250/361 R |
| 2005/0003295 | A1 | * | 1/2005 | Koninckx et al. ........... 430/139 |
| 2005/0040340 | A1 | * | 2/2005 | Morikawa et al. ........ 250/484.4 |

* cited by examiner

*Primary Examiner*—David P. Porta
*Assistant Examiner*—Casey Bryant
(74) *Attorney, Agent, or Firm*—Lucas & Mercanti, LLP (57) ABSTRACT

A scintillator plate for radiation containing a substrate having thereon a fluorescent layer, wherein the fluorescent layer contains CsF crystals.

10 Claims, 4 Drawing Sheets

FIG. 6

SCINTILLATOR PLATE FOR RADIATION AND RADIOGRAPHIC IMAGE DETECTOR

This application is based on Japanese Patent Application No. 2005-287312 filed on Sep. 30, 2005 in Japanese Patent Office, the entire content of which is hereby incorporated by reference.

FIELD OF THE INVENTION

The present invention relates to a scintillator plate for radiation and a radiographic image detector, and more particularly to a scintillator plate for radiation and a radiographic image detector equipped with a fluorescent layer utilizing Cs as a base material.

BACKGROUND OF THE INVENTION

Conventionally, radiographic images such as X-ray images have been commonly utilized for diagnoses of medical conditions of a patient. In particular, conventional radiographic images have been improved to achieve a high reliability, superior cost performance, a high sensitivity, and a high image quality. Thus, they are still utilized at medical facilities all over the world as an image pick-up system.

However, the image information in conventional radiographic images is so-called analogue image information, and it is impossible to perform free image processing and image transmission as compared to digital image information which has been ever developing in recent years.

Therefore, in recent years, a radiographic image detector system such as a computed radiography (CR) and a flat-panel type radiation detector has come into use. Since these new systems directly obtain a digital radiographic image and directly display the image on an image display device such as a cathode ray tube and a liquid crystal panel, it is not necessary to use photographic film. As a result, these digital X-ray image detector systems have decreased the need of image formation by silver salt photography techniques and significantly improved convenience of diagnostic works at hospitals and clinics.

CR has come into practical use in the medical field and is, at present, one of the digital technologies for X-ray images. However, the sharpness is not sufficient nor is the spatial resolution, and CR has not achieved an image quality of a screen-film system. In addition, a flat plate X-ray detector system (FPD) employing a thin film transistor (TFT), described in "Amorphous Semiconductor Usher in Digital X-ray Imaging" by Jhon Rawlands, Physics Today, 1997 Nov., p. 24, and "Development of a High Resolution, Active Matrix, Flat-Panel Imager with Enhanced Fill Factor" by L. I. Anthonuk, SPIE, 1997, vol. 32, p. 2, has been developed as a further new digital X-ray image technology. A FPD is characterized by being smaller in size than a CR and being superior in image quality of image pick-up at a high dose. However, a FPD had a problem that the SN ratio decreased at image pick-up at a low dose and prevented a sufficient image quality due to electric noise derived from a TFT and a circuit.

A FPD utilizes a scintillator plate which is prepared from an X-ray fluorescent material provided with a property to convert radiation into visible light, and it is necessary to utilize a scintillator plate having a high emission efficiency to improve the SN ratio in image pick-up at a low dose. Generally, an emission efficiency of a scintillator plate is determined by the thickness of the fluorescent layer and the X-ray absorption coefficient of a fluorescent material, however, the thicker the fluorescent layer, the lower the sharpness due to scattering of emission light in a fluorescent layer. Therefore, the layer thickness is determined after sharpness required for the image quality.

Particularly, since cesium iodide (CsI) has a relatively high conversion rate from X-ray to visible light and the fluorescent material can be easily formed into a columnar crystal structure by vacuum evaporation, scattering of emission light in a crystal is depressed by an optical guide effect, whereby the thickness of a fluorescent layer can be made thicker.

However, since CsI alone shows a low emission efficiency, patent literature 1, discloses a technology, in which a mixture of CsI and sodium fluoride (NaI) is evaporated at an arbitrary mole ratio to accumulate sodium activated cesium iodide (CsI:Na) on a substrate, followed by annealing to improve the visible conversion efficiency. Such material is utilized as an X-ray fluorescent material.

Further, recently, for example patent literature 2, discloses a technology, in which thin layers are formed comprising CsI by vacuum evaporation and an activator substance such as indium (In), thallium (Tl), lithium (Li), potassium (K), rubidium (Rb) and sodium (Na) by spattering to prepare an X-ray fluorescent material.

However, the X-ray fluorescent material prepared by a method described in patent literature 1 or a method described in patent literature 2, still have low emission efficiency by radioactive irradiation and require further improvement.

[Patent literature 1] Examined Japanese Patent Application Publication No. 54-35060

[Patent literature 2] Japanese Patent Publication Open to Public Inspection No. 2001-59899

SUMMARY OF THE INVENTION

An object of the present invention is to provide a scintillator plate exhibiting an improved efficiency of light emission induced by radioactive irradiation, and to provide a radiographic image detector employing the scintillator plate.

One of the aspects of the present invention to achieve the above object with a scintillator plate for radiation containing a substrate having thereon a fluorescent layer, wherein the fluorescent layer contains CsF crystals.

DESCRIPTION OF THE PREFERRED EMBODIMENTS

The above object of the present invention is achieved by the following aspects.

One aspect of the present invention is a scintillator plate for radiation which emits light when irradiated with radiation containing a substrate having thereon a fluorescent layer, wherein the fluorescent layer contains CsF crystals.

Another aspect of the present invention is the scintillator plate having the CsF crystals existing on a surface of the fluorescent layer.

Another aspect of the present invention is the scintillator plate of which the fluorescent layer contains CsI—CsF mixed crystals.

Another aspect of the present invention is the scintillator plate in which the CsI—CsF mixed crystals are formed by a method containing the steps of: preparing a CsI—CsF mixture by mixing CsI crystals and CsF crystals; and forming the CsI—CsF mixed crystals via vacuum evaporation using the CsI—CsF mixture as a first source and an activator as a second source.

Another aspect of the present invention is the scintillator plate of which the fluorescent layer contains columnar crystals of a fluorescent material containing CsI and an activator, and CsF crystals are formed on surfaces of the columnar crystals.

Another aspect of the present invention is the scintillator plate of which the fluorescent layer is formed by a method containing the steps of: forming CsI columnar crystals via vacuum evaporation using CsI as a first source and an activator as a second source; and forming CsF crystals on surfaces of the columnar crystals.

Another aspect of the present invention is the scintillator plate in which CsF crystals were formed on the surfaces of the CsI columnar crystals by heating CsI columnar crystals in an atmosphere of a fluorine-containing solvent gas.

Another aspect of the present invention is the scintillator plate of which the fluorescent layer further contains an activator; and the activator is a compound containing one of the elements selected from the group consisting of iridium, thallium, potassium, rubidium, sodium and europium.

Another aspect of the present invention is the scintillator plate, wherein the fluorine-containing solvent gas is formed by evaporating a fluorine-containing solvent; and the fluorine-containing solvent is represented by Formula (1): Formula (1) $(R1-O)_a—R2$, wherein "a" represents an integer of 1 to 3; R1 and R2 each is an alkyl group or an aryl group; and R1 or R2 comprises a fluorine atom and a hydrogen atom.

Another aspect of the present invention is any one of the above scintillator plates in which CsI is replaced with CsBr.

Another aspect of the present invention is a radiographic image detector containing any one of the above scintillator plates and an output board which converts light emitted from the scintillator plate into an electric signal.

In the following, the best modes to practice of the present invention will be explained with reference to drawings; however, the scope of the present invention is not limited to the exemplified drawings.

Figure 1:
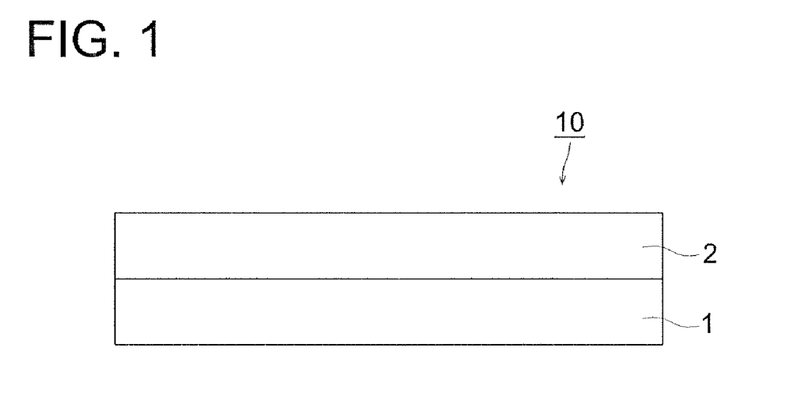
FIG. 1 is a cross-sectional view of a scintillator plate for radiation.

Scintillator plate 10 for radiation according to the present invention is equipped with fluorescent layer 2 on substrate 1 as shown in FIG. 1, and is designed to emit electromagnetic waves (light) having wavelengths from 300 to 800 nm, that is, primarily comprising visible light covering from ultraviolet light to infrared light by absorbing energy of radiation when said fluorescent layer 2 is irradiated with radioactive radiation.

As substrate 1, usable are those capable to transmit radiation like X-rays, for example, a resin, a glass plate and a metal plate are utilized, however, preferable are an aluminum plate and a resin sheet such as a carbon fiber reinforced resin sheet having a thickness of not more than 1 mm, with respect to improving durability and providing a lighter substrate.

Further, fluorescent layer 2 is made of crystals containing Cs as a base material, and may include such as CsBr and CsCl in addition to CsI. Further, mixed crystals may be formed by utilizing plural raw materials, which constitute fluorescent layer 2 containing the aforesaid Cs as a base, at an arbitrary mixing ratio, and said mixed crystals may be utilized as a base.

It was found that by making a slight amount of CsF crystals exist on the surface of the crystals, which constitutes fluorescent layer 2, emission efficiency of fluorescent layer 2 can be significantly increased.

Herein, a method to make CsF crystals exist on the surface of fluorescent layer 2 includes a method in which fluorescent layer 2 is formed by using a fluorescent raw material containing CsF to make CsF exist as mixed crystals, and a method in which fluorescent layer 2 is formed by vacuum evaporation, first, followed by forming crystals containing CsF (CsF crystals) on the surface of thus prepared fluorescent layer 2. Since scintillator plate 10 having fluorescent layer 2 formed by vacuum evaporation exhibits a columnar crystal structure, the surface area of scintillator plate 10, which means an interface with the outside, is notably increased, whereby the emission efficiency can also be increased.

Figure 2:
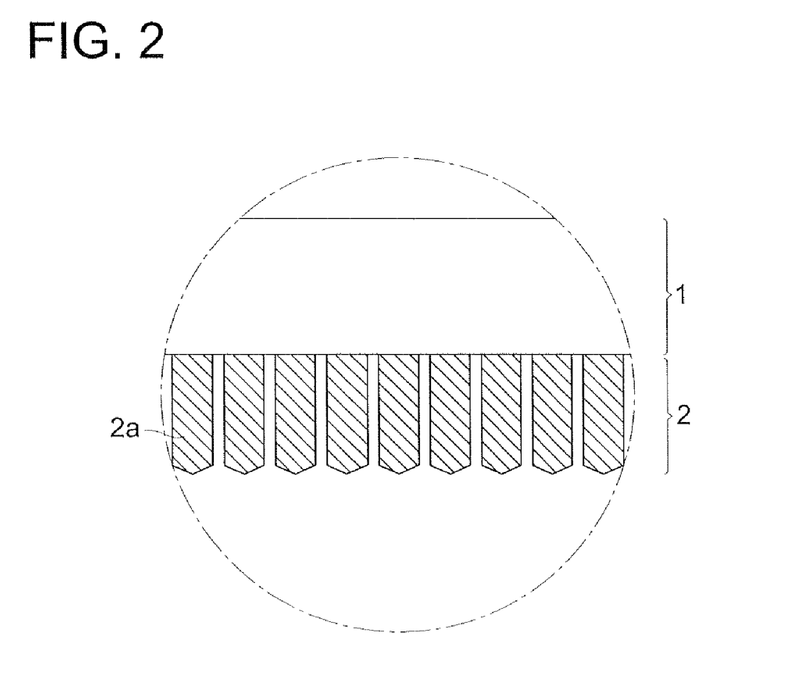
FIG. 2 is an enlarged cross-sectional view of the surface of a fluorescent layer with CsF being present as mixed crystals of a fluorescent material.

In the following, a method to make CsF as mixed crystals of a fluorescent material where CaF exists on the surface of fluorescent layer 2 will be explained.

For example, in the case of utilizing CsI as a base of a fluorescent material, preparation of mixed crystals of CsI and CsF (hereinafter, referred to as CsT—CsF mixed crystals) will be described first. A mixture of CsI and CsF is prepared first by addition of CsI and CsF crystals. The CsI—CsF mixed crystals are prepared via a well known method in the art of vacuum evaporation using a CsI—CsF mixture and an activator as supply sources, on substrate 1 (a vacuum evaporation process). As a result, fluorescent layer 2 containing CsI—CsF mixed crystals 2a in a form of a columnar crystal structure is formed on substrate 1, where CsF is present on the surface of the crystals, which results in increasing the emission efficiency of the fluorescent layer.

Herein, the amount of CsF is preferably 0.03-7.0 mol % and more preferably 0.03-5.0 mol % based on the weight of CsI as a base. When the amount of CsF is less than 0.03 mol %, the amount of CsF existing on the crystal surface also becomes small, and when it is over 7 mol %, the ratio of CsF which does not directly contributes to emission by radiation, (namely, impurity) increases. Accordingly, in both cases, it is assumed that a sufficient effect to increase the emission efficiency can not be obtained.

CsI—CsF mixed crystals 2a can also be prepared as follows: after a CsI—CsF mixture is prepared, the CsT—CsF mixture is placed in an electric oven and calcinated at a temperature of not lower than 350° C., and the obtained burned product is ground. Then the powdered calcination product is dispersed in a binder well known in the art which coats substrate 1, whereby fluorescent layer 2 can be formed, which constitutes scintillator plate 10 in which CsF is present on the surface of fluorescent layer 2.

Herein, a binder can reduce granularity of radiographic images by improving dispersibility of a fluorescent material as well as by increasing the packing ratio of a fluorescent material. Specific examples of a binder include polyurethane, vinyl chloride copolymer, vinyl chloride-acrylonitrile copolymer, butadiene-acrylonitrile copolymer, polyamide resin, polyvinyl butyral, cellulose derivatives, styrene-butadiene copolymer, various types of synthetic rubber type resin, phenol resin, epoxy resin, urea resin, melamine resin, phenoxy resin, silicone resin, acrylic resin and urea formamide resin. Among them, polyurethane, polyester, vinyl chloride copolymer, polyvinyl butyral and nitrocellulose are preferred.

A weight content of a fluorescent material dispersed in the aforesaid binder is preferably 90-99%. Further, a thickness of scintillator plate 10 is determined based on balance of granularity and sharpness of radiographic images. That is, there is a tendency that granularity is reduced while sharpness is lowered when scintillator plate 10 is thick, on the contrary, sharpness is improved but granularity becomes notable when scintillator plate 10 is thin. In scintillator plate 10 utilized in the present invention, the thickness to exhibit the both abilities of granularity and sharpness in good balance is 20 μm-1 mm and preferably 50-600 μm.

Further, an activator applicable in the present invention may be any one well known in the art, however, it can be arbitrarily selected depending on required characteristics such as an emission wavelength and moisture resistance. Specifically, listed are compounds of such as indium (In), thallium (Tl), lithium (Li), potassium (K), rubidium (Rb), sodium (Na), europium (Eu), copper (Cu), cerium (Ce), zinc (Zn), titanium (Ti), gadolinium (Gd) and terbium (Tb), however, the present invention is not limited thereto.

Figure 3:
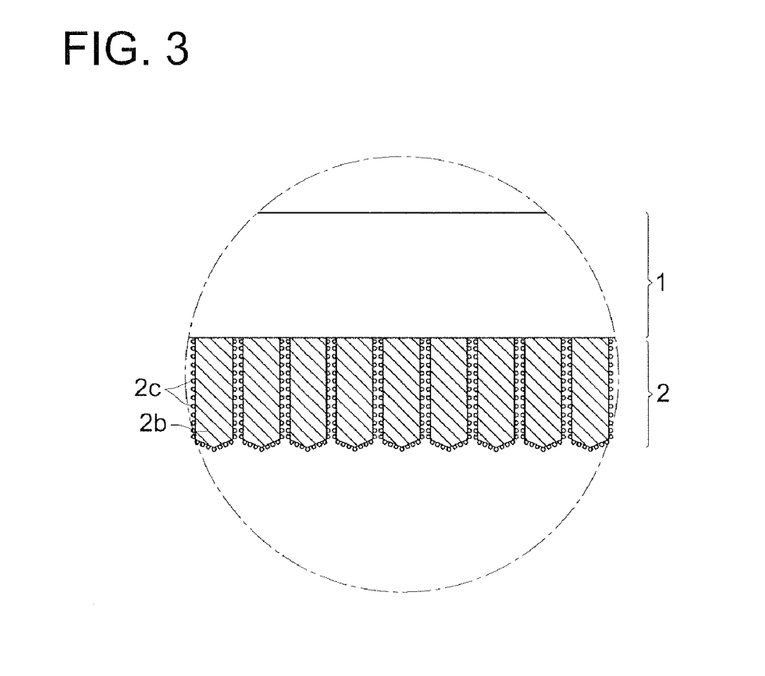
FIG. 3 is an enlarged cross-sectional view of the surface of a fluorescent layer with CsF crystals being present on the surface of a fluorescent layer.

Next, a method to form CsF crystals on the surface of said fluorescent layer 2, after fluorescent layer has been formed by vacuum evaporation, will be explained.

First, fluorescent layer 2 having a columnar crystal structure is formed on substrate 1 using a commonly known vacuum evaporation method onto substrate 1. In the case of utilizing CsI as a primary component of a fluorescent material, the vacuum evaporation is performed employing CsI and an activator as supply sources (vacuum evaporation process). As an activator utilized here, materials similar to those explained in a method to make CsF present on the surface of fluorescent layer 2 in the aforesaid mixed crystals of a fluorescent material. And, after a vacuum evaporation process, CsF crystals are formed on the surface of fluorescent layer 2 (CsF crystals forming process). Specifically, substrate 1 on which fluorescent layer 2 has been formed is placed in a predetermined vessel having been introduced with a fluorine-containing solvent, and said vessel interior is heated to evaporate a fluorine-containing solvent. That is, after a vacuum evaporation process, substrate 1, on which fluorescent layer has been formed, is subjected to a heat treatment under an atmosphere of a vaporized fluorine-containing solvent (heating process).

As a result, as shown in FIG. 3, scintillator plate 10 for radiation is prepared, which contains fluorescent layer 2 in which columnar crystals 2b containing CsI and an activator as primary components formed on substrate 1, and CsF crystals 2c formed on the surfaces of columnar crystals 2b. At that time, since CsF forms CsF crystals 2c while being absorbed on the surfaces of columnar crystals 2b having been formed on substrate 1, existing ratio of CsF on the surface of fluorescent layer 2 is efficiently increased compared to a method to make CsF present on the surface of fluorescent layer 2 by utilizing the aforesaid CsF mixed crystals, whereby an effect to increase emission efficiency by radioactive irradiation is specifically improved.

Herein, the effect of the present invention can be obtained provided that the total amount of CsF formed on the crystal surface is not less than 10 ppm against CsI as a base, however, the amount is preferably not less than 20 ppm, wherein "ppm" used in the present invention represents "ppm by mole" unless otherwise specified.

Further, the total amount of CsF formed on the crystal surface can be arbitrarily adjusted depending on heating time and heating temperature, however, the heating temperature is preferably not lower than 80° C. and, in view of operation safety, not higher than 250° C.

Further, as a fluorine-containing solvent utilized at this time, (1) a noncombustible solvent without having a inflammable point is preferably applied with respect to being subjected to a heating treatment (with respect to a requirement for not having an inflammable point in view of a fire law concerning such as inflammability and explosiveness).

Further, flon substituting materials which are considered to be useful with respect to (2) environmental adaptability and (3) toxicity against a living body in addition to the aforesaid view point (1). Among them, "HFE (hydrofluoroether)" which is the newest flon substituting material is excellent in (2) and (3) and is preferably utilized as said halogenated solvent.

HFE is comprised of carbon, fluorine, hydrogen and at least one oxygen atom, and may further contain at least one hetero atom such as sulfur or trivalent nitrogen which is incorporated into a carbon main chain. HFE may present a straight chain form, a branched form or a cyclic form, and may be provided with a structure constituted of a combination thereof such as an alkyl alicyclic ring. However, HFE preferably contains no unsaturated bond.

As specific examples of HFE, a compound represented by following general formula (I) can be utilized.

$$(R1-O)_a-R2 \qquad (1)$$

In above general formula (1), "a" is an integer of 1-3, R1 and R2 are groups selected from a group containing an alkyl group and an aryl group, and may be the same or different from each other. Either of R1 and R2, or the both may contain at least one hetero atom in the main chain, and the total number of fluorine atoms contained in HFE is preferably not less than the total number of a hydrogen atom in said HFE. R1 and R2 may present a straight chain form, a branched form or a cyclic form, and, in addition to this, may contains at least one unsaturated carbon-carbon bond, however, both of R1 and R2 preferably contain an atomic group in which each element makes a saturated bond with each other.

HFE provided with such characteristics includes, for example, Novec (registered trademark) HFE-7100, 7100□L and 7200, manufactured by Sumitomo 3M Co., Ltd.; and HFF—S7 (product name) manufactured by Daikin Industries, Ltd. and these HFE available on the market can be suitably employed as a halogenide solvent utilizable in a heating process.

Next, the action of scintillator plate 10 for radiation will be explained.

When radiation is incident against scintillator plate 10 for radiation from the fluorescent layer 2 side toward the substrate 1 side, fluorescent material particles in fluorescent layer 2 absorbs energy of the radiation incident into fluorescent layer 2 and electromagnetic waves corresponding the intensity is emitted. At this time, since CsF crystal is present on the surface of fluorescent layer 2 to increase the emission efficiency of electromagnetic waves, the emission efficiency of fluorescent layer 2 can be significantly improved.

As described above, in scintillator plate 10 for radiation according to the present invention, since a slight amount of CsF crystals can be present on the surface of crystals constituting fluorescent layer 2, the emission efficiency of fluorescent layer 2 can be significantly improved by increasing emission efficiency of electromagnetic waves at the time of radioactive irradiation.

Next, radiographic image detector 100, which is formed by use of scintillator plate for radiation 10 shown in the aforesaid FIG. 1, will be explained with reference to FIGS. 4 and 5.

Figure 4:
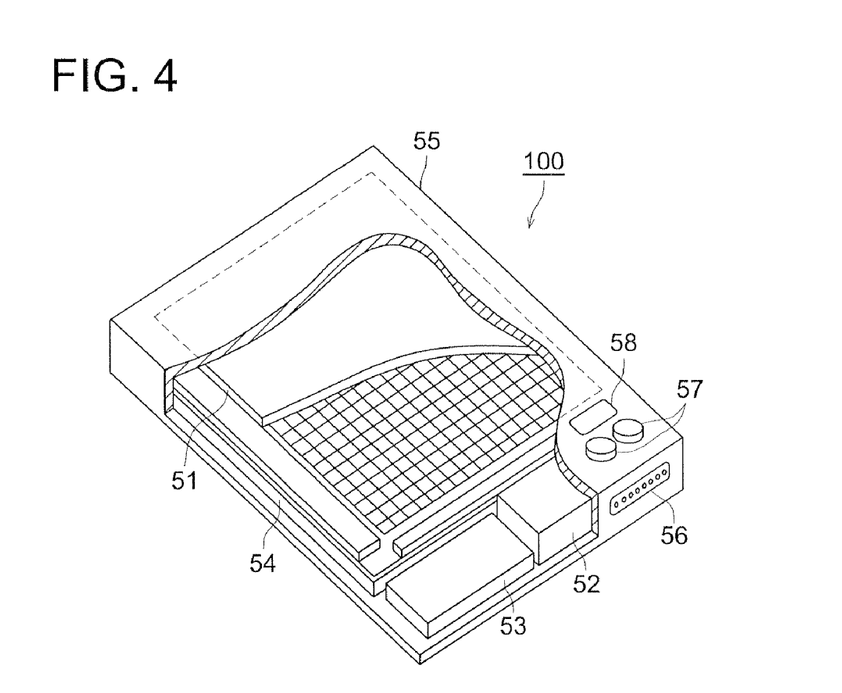
FIG. 4 is a constitutional drawing of a radiographic image detector.

As shown in FIG. 4, radiographic image detector 100 is equipped with such as image pick-up panel 51, control section 52 to control the movement of radiographic image detector 100, memory section 53, which is a memory means to memorize an image signal output from image pick-up panel 51 by use of a rewritable exclusive memory (such as a flush memory), electric source section 54, which is an electric power supply means to supply electric power required to obtain an image signal by driving image pick-up panel 51, in the interior of case 55, and case 55 is appropriately equipped with such as connector for communication 56 to perform communication with the outside of radiographic image detector 100, operation section 57 to switch the movement of radiographic image detector 100 and display section 58 which shows that preparation for image pick-up of radiographic images has been completed or a predetermined amount of image signals has been written on memory section 53.

Herein, when radiographic image detector 100 is equipped with memory section 53 to memorize an image signal of a radiographic image in addition to electric source section 54 and radiographic image detector 100 is made freely attachable via connector 56, radiographic image detector 100 can be provided with a potable structure.

Figure 5:
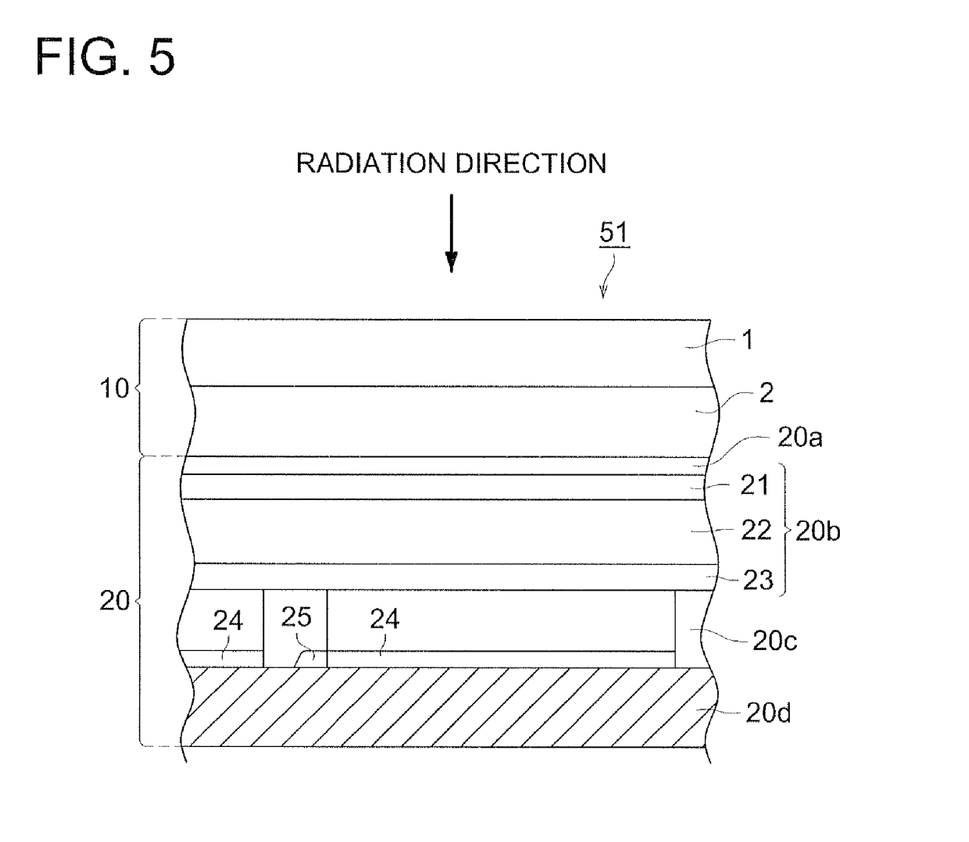
FIG. 5 is a cross-sectional view of an image pick-up panel to constitute FIG. 4.

As shown in FIG. 5, image pick-up panel 51 has scintillator plate 10 for radiation and output board 20 which outputs an image signal on absorbing electromagnetic waves from scintillator plate 10 for radiation.

Scintillator plate 10 for radiation is arranged on the radiation plane side of image pick-up panel 51 and constituted so as to emit electromagnetic waves corresponding to the intensity of incident radiation.

Output board 20 is arranged on the surface opposite to the radiation surface of scintillator plate 10 for radiation, and equipped with separating film 20a, photoelectric conversion element 20b, image signal output layer 20c and substrate 20d in this order from the scintillator plate 10 for radiation 10 side.

Separation film 20a is to separate scintillator plate 10 for radiation from other layers and employs such as Oxinitride.

Photoelectric conversion element 20b is constituted of transparent electrode 21, charge generation layer 22, which generates an electric charge by electromagnetic waves incident through transparent electrode 21, and counter electrode 23 which is a counter pole against transparent electrode 21, and transparent electrode 21, charge generation layer 22 and counter electrode 23 are arranged in this order from the separation film 20a side.

Transparent electrode 21 is an electrode to transmit electromagnetic waves to be subjected to photoelectric conversion, and is formed by utilizing a conductive transparent material such as indium tin oxide (ITO), SnO2 and ZnO.

Charge generation layer 22 is formed in a thin layer form on the one surface side of transparent electrode 21, containing an organic compound which performs charge separation by light as a compound capable of photoelectric conversion, and contains an electron donor capable of generating a charge and a conductive compound as an electron acceptor, respectively. In charge generation layer 22, an electron donor is excited to release an electron when electromagnetic waves is incident, and the released electron is transferred to an electron acceptor to generate a charge, that is, to generate carriers of a positive hole and an electron.

Herein, a conductive compound as an electron donor includes a p-type conductive polymer compound, and p-type conductive polymer compounds are preferably those having a basic skeleton of polyphenylene vinylene, polythiophene, poly(thiophene vinylene), polyacetylene, polypyrrole, polyfluorene, poly(p-phenylene) or polyaniline, which are shown as compounds 1-1-1-8 (in compounds 1-1-1-8, x is preferably an integer of at least 1).

Compound 1-1 polyphenylene vinylene

Compound 1-2 polythiophene

Compound 1-3 poly(thiophene vinylene)

Compound 1-4 polyacetylene

Compound 1-5 polypyrrole

Compound 1-6 polyfluorene

Compound 1-7 poly(p-phenylene)

Compound 1-8 polyaniline x ≥ 1

Further, a conductive compound as an electron acceptor includes an n-type conductive polymer compound, and n-type conductive polymer compounds are preferably those having a basic skeleton of polypyridine, which is shown as compounds 2-1-2-2 and specifically preferably those having a basic skeleton of poly(p-pyridyl vinylene) (in compounds 2-1-2-2, x is an integer of at least 1).

Compound 2-1
polypyridine

Compound 2-2
poly(p-pyridyl vinylene)

x ≥ 1

The layer thickness of charge generation layer 22 is preferably not less than 10 nm (specifically not less than 100 nm) in view of assuring light absorption quantity and not more than 1 μm (specifically not more than 300 nm) in view of not excessively increasing electric resistance.

Counter electrode 23 is arranged on the opposite side of the surface of charge generation layer 22 on which electromagnetic waves are incident. Counter electrode 23 can be utilized by selecting among a general metal electrode of such as gold, silver, aluminum and chromium; and transparent electrode 21, however, metal, alloy, conductive compounds and mixtures thereof, which have a small (not more than 4.5 eV) work function, are preferably utilized as an electrode substance with respect to achieving good characteristics.

Further, a buffer layer which acts as a buffer zone may be arranged between charge generation layer 22 and each electrode (transparent electrode 21 and counter electrode 23) sandwiching charge generation layer 22 not to make charge generation layer 22 react with these electrodes. A buffer layer is formed by utilizing such as lithium fluoride, poly(3,4-ethylenedioxythiophene):poly(4-styrenesulfonato) and 2,9-dimethyl-4,7-diphenyl[1,10]phenanthroline.

Image signal output layer 20c performs accumulation of charge obtained by photoelectric conversion element 20b and output of a signal based on the accumulated charge, and is constituted of capacitor 24, which is a charge accumulation element to accumulate charge generated in photoelectric conversion element 20b for each pixel, and transistor 25, which is an image signal output element to output the accumulated charge as a signal.

As transistor 25, for example, a TFT (a thin film transistor) is utilized. This TFT may be either those of an inorganic semiconductor type utilized in such as a liquid crystal display or those employing an organic semiconductor, and is preferably a TFT formed on plastic film. As a TFT formed on plastic film, amorphous silicon type is well known, however, in addition to this, a FSA (Fluid Self Assembly) technology having been developed by Alien Technology Corp., USA, that is, a technology in which a TFT may be formed on flexible plastic film by arranging micro CMOS (Nanoblocks) made of single crystal silicon on embossed plastic film may be also utilized. Further, a TFT employing an organic semiconductor described in literatures such as Science 283, 822 (1999) and Appl. Phys. Lett., 771488 (1998) and Nature, 403,521 (2002) may be utilized.

In this manner, as transistor 25 utilized in the present invention, a TFT prepared by means of the above-described FSA technology and a TFT employing an organic semiconductor are preferable and specifically preferable is a TFT employing an organic semiconductor. In the case of a TFT being constituted of this organic semiconductor, since an installation such as a vacuum evaporation system required in the case of a TFT being constituted of silicon becomes unnecessary and a TFT can be formed applying such as a printing technology and an inkjet technology, the manufacturing cost can be decreased. Further, it is possible to form a TFT on a plastic substrate, which is weak against heat, because a low processing temperature can be applied.

Transistor 25 is electrically connected with a collective electrode (being not shown in the drawing) which accumulates charge generated in photoelectric conversion element 20b and becomes one electrode of capacitor 24. In capacitor 24, charge generated in photoelectric conversion element 20b is accumulated and the accumulated charge is read out by driving transistor 25. That is, a signal for each pixel can be output by driving transistor 25.

Substrate 20d functions as a support for image pick-up panel 51, and can be constituted of a material similar to substrate 1.

Next, action of radiographic image detector 100 will be explained.

First, radiation incident against radiographic image detector 100 is incident from the scintillator plate 10 for radiation side toward the substrate 20d side, of image pick-up panel 51.

Then, radiation incident on scintillator plate 10 for radiation, energy of which is absorbed by fluorescent material particles in scintillator plate 10 for radiation, makes electromagnetic waves emit corresponding to the intensity. Among electromagnetic waves emitted, electromagnetic waves entering into output board 20 reach to charge generation layer 22 penetrating through transparent electrode 21, of output board 20. And, electromagnetic waves are absorbed in charge generation layer 22 to form pairs of a positive hole and an electron (a charge separation state) corresponding to the intensity.

Thereafter, a positive hole and an electron, which comparise generated charge, are transferred to different electrodes (a transparent electrode film and a conductive layer), respectively, by an internal electric field generated by application of a bias voltage from electric source section 54, whereby a photoelectric current flows.

Then, a positive hole sent to the counter electrode 23 side is accumulated in capacitor 24 on radiographic image signal output layer 20c. The accumulated positive holes output an image signal when transistor 23 connected to capacitor 24 is driven, and simultaneously the output image signal is memorized in memory section 53.

In the above manner according to this embodiment, since radiographic image detector 100 is equipped with scintillator plate 10 for radiation, which can significantly increase emission efficiency due to radioactive irradiation by providing CsF crystal on the surface of fluorescent layer 2, the photoelectric conversion efficiency can be increase to improve a SN ratio at the time of image pick-up of a radiographic image at a low dose as well as to prevent generation of image unevenness and linear noise.

EXAMPLES

In the following, the present invention will be specifically explained with reference to examples; however, embodiments of the present invention are not limited thereto.

Radiographic image conversion panels of examples 1-14 and of comparative examples 1 and 2 were prepared.

Example 1

Preparation of Vacuum Evaporation Source Material

CsI was mixed with CsF and thallium iodide as an activator at a ratio of 0.01 (mol %) and 0.3 (mol %), respectively, and this mixture was ground and mixed in a mortar to be made homogeneous.

(Preparation of Radiographic Image Conversion Panel)

Figure 6:
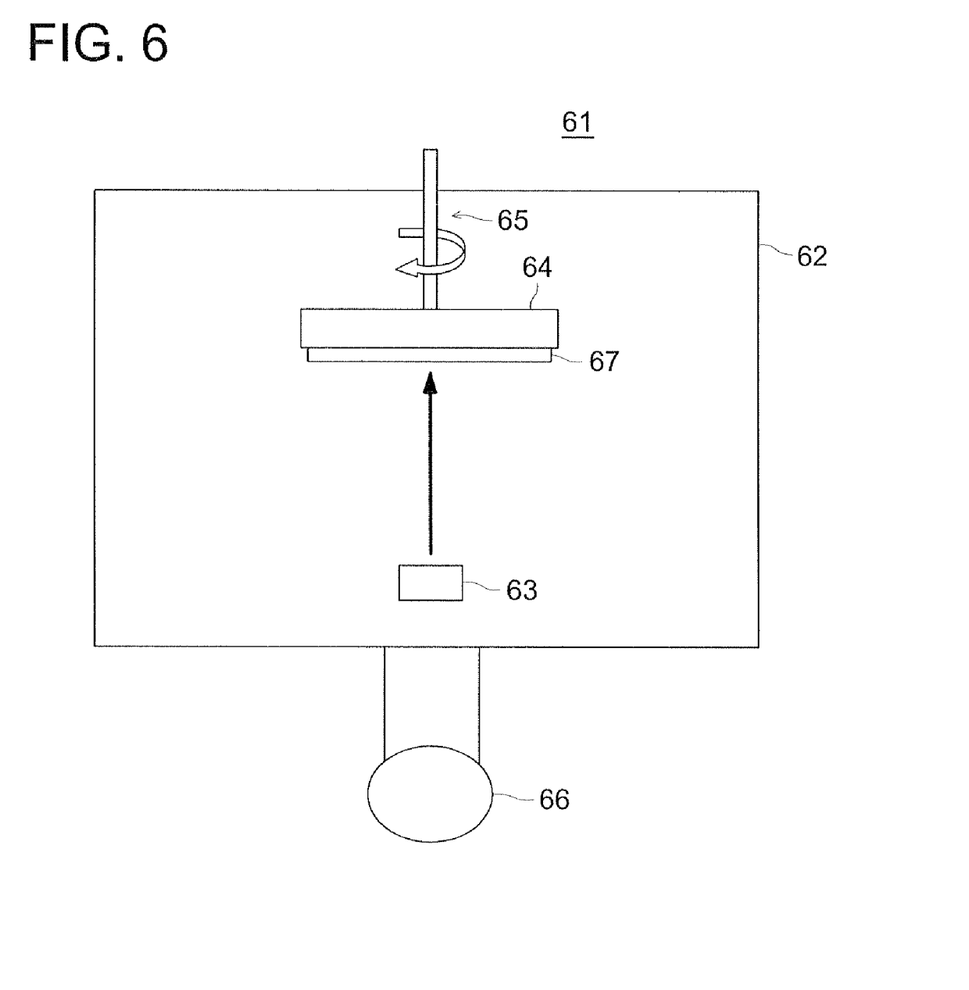
FIG. 6 is a schematic constitutional drawing of a vacuum evaporation system utilized in the examples.

The above-described vacuum evaporation source material was deposited on one surface of a substrate containing a carbon fiber reinforced resin sheet by use of vacuum evaporation system 61 shown in FIG. 6, whereby a fluorescent layer was formed.

That is, first, simultaneously with filling the above-described fluorescent material raw material as a vacuum evaporation material in resistance heating crucible 63 which is a vacuum evaporation source, substrate 67 is placed on substrate holder 64 which is rotated by rotation mechanism 65, and the distance between said substrate 67 and resistance heating crucible 63 was adjusted to 400 mm. Successively, after the interior of vacuum evaporation system 61 was once evacuated by use of vacuum pump 66 and an Ar gas was introduced to adjust the vacuum degree to 0.1 Pa, substrate 67 was kept at 150° C. while being rotated at 10 rpm by rotation mechanism 65. Next, resistance heating crucible 63 was heated to evaporate a fluorescent material and deposition on substrate 67 was finished when the layer thickness of a fluorescent layer reached 500 μm, whereby radiographic image conversion panel of example 1 was prepared. In FIG. 6, 62 represents a vacuum vessel and 66 represents a vacuum pump.

(Measurement of Luminance)

The obtained radiographic image conversion panel of example 1 was set on a CMOS flat panel (X-ray CMOS camera system ShadowBox 4KEV, produced by Rado-icon Imaging Corp.) having a size of 10 cm×10 cm, X-rays of tube voltage of 80 kvp being irradiated from the back surface of each sample to measure luminance based on output data of 12 bits, and the measured value was designated as "emission luminance (sensitivity)". Radiographic image conversion panel of example 1 showed an emission luminance of 1.8, and this together with other measurement results is shown in following table 1. Herein, the value to show an emission luminance of a radiographic image conversion panel utilized in each example is a relative value when an emission luminance of a radiographic image conversion panel of comparative example 1 is set to 1.0.

TABLE 1

| Radiographic image conversion panel | TlI (mol %) | CsF (mol %) | Luminance |
|---|---|---|---|
| Example 1 | 0.3 | 0.01 | 1.8 |
| Example 2 | 0.3 | 0.03 | 2.2 |
| Example 3 | 0.3 | 0.1 | 2.5 |
| Example 4 | 0.3 | 0.5 | 2.7 |
| Example 5 | 0.3 | 1.0 | 2.6 |
| Example 6 | 0.3 | 2.0 | 2.5 |
| Example 7 | 0.3 | 5.0 | 2.0 |
| Example 8 | 0.3 | 7.0 | 1.5 |
| Comparative example 1 | 0.3 | None | 1.0 |

Example 2

A radiographic image conversion panel was prepared in a similar manner to example 1, except that, in preparation of a vacuum evaporation source material, CsI was mixed with CsF and thallium iodide (TlI) at ratios against CsI of 0.03 (mol %) and 0.3 (mol %), respectively, and the obtained sample was designated as a radiographic image conversion panel of example 2. Thereafter, luminance measurement was performed in a similar manner to example 1 to determine an emission luminance of the radiographic image conversion panel of example 2 to be 2.2. The measurement result is shown in table 1.

Example 3

A radiographic image conversion panel was prepared in a similar manner to example 1, except that, in preparation of a vacuum evaporation source material, CsI was mixed with CsF and thallium iodide (TlI) at ratios against CsI of 0.1 (mol %) and 0.3 (mol %), respectively, and the obtained sample was designated as a radiographic image conversion panel of example 3. Thereafter, luminance measurement was performed in a similar manner to example 1 to determine an emission luminance of the radiographic image conversion panel of example 2 to be 2.5. The measurement result is shown in table 1.

Example 4

A radiographic image conversion panel was prepared in a similar manner to example 1, except that, in preparation of a vacuum evaporation source material, CsT was mixed with CsF and thallium iodide (TlI) at ratios against CsI of 0.5 (mol %) and 0.3 (mol %), respectively, and the obtained sample was designated as a radiographic image conversion panel of example 4. Thereafter, luminance measurement was performed in a similar manner to example 1 to determine an emission luminance of the radiographic image conversion panel of example 4 to be 2.7. The measurement result is shown in table 1.

Example 5

A radiographic image conversion panel was prepared in a similar manner to example 1, except that, in preparation of a vacuum evaporation source material, CsI was mixed with CsF and thallium iodide (TlI) at ratios against CsI of 1.0 (mol %) and 0.3 (mol %), respectively, and the obtained sample was designated as a radiographic image conversion panel of example 5. Thereafter, luminance measurement was performed in a similar manner to example 1 to determine an emission luminance of the radiographic image conversion panel of example 5 to be 2.6. The measurement result is shown in table 1.

Example 6

A radiographic image conversion panel was prepared in a similar manner to example 1, except that, in preparation of a vacuum evaporation source material, CsI was mixed with CsF and thallium iodide (TlI) at ratios against CsI of 2.0 (mol %) and 0.3 (mol %), respectively, and the obtained sample was designated as a radiographic image conversion panel of example 6. Thereafter, luminance measurement was performed in a similar manner to example 1 to determine an emission luminance of the radiographic image conversion panel of example 6 to be 2.5. The measurement result is shown in table 1.

Example 7

A radiographic image conversion panel was prepared in a similar manner to example 1, except that, in preparation of a vacuum evaporation source material, CsI was mixed with CsF and thallium iodide (TlI) at ratios against CsI of 5.0 (mol %) and 0.3 (mol %), respectively, and the obtained sample was designated as a radiographic image conversion panel of example 7. Thereafter, luminance measurement was performed in a similar manner to example 1 to determine an emission luminance of the radiographic image conversion panel of example 7 to be 2.0. The measurement result is shown in table 1.

Example 8

A radiographic image conversion panel was prepared in a similar manner to example 1, except that, in preparation of a vacuum evaporation source material, CsI was mixed with CsF and thallium iodide (TlI) at ratios against CsI of 7.0 (mol %) and 0.3 (mol %), respectively, and the obtained sample was designated as a radiographic image conversion panel of example 8. Thereafter, luminance measurement was performed in a similar manner to example 1 to determine an emission luminance of the radiographic image conversion panel of example 8 to be 1.5. The measurement result is shown in table 1.

Comparative Example 1

A radiographic image conversion panel of comparative example 1 was prepared in a similar manner to example 1, except that, in preparation of a vacuum evaporation source material, CsF was not mixed. Thereafter, luminance measurement of a radiographic image conversion panel of comparative example 1 was performed in a similar manner to example 1.

Example 9

Preparation of Radiographic Image Conversion Panel Having Been Treated with Fluorine-containing Gas A radiographic image conversion panel was prepared in a similar manner to example 1, except that, in preparation of a vacuum evaporation source material, CsF was not mixed.

Thereafter, the obtained radiographic image conversion panel is subjected to a fluorine-containing gas treatment. First, the sample panel was sealed in a closed vessel having a volume of 6 L together with 20 cc of a fluorine-containing solvent (HFE 7100 having a chemical formula of $C_4F_9OCH_3$) manufactured by 3M Corp., and subjected to a heat treatment at 70° C. Then, a fluorine-containing gas was evacuated by opening a valve attached to the vessel while the temperature was kept. After evacuation, spontaneous cooling was performed to obtain a radiographic image conversion panel. The obtained radiographic image conversion panel having been treated with a fluorine-containing gas was designated as a radiographic image conversion panel of example 9.

(Measurement of Luminance)

Luminance measurement was performed in a similar manner to example 1 to determine an emission luminance of the radiographic image conversion panel of example 9 to be 1.2. The measurement result is shown in table 2. Herein, in table 2, a value to express an emission luminance of each sample is a relative value when an emission luminance of radiographic image conversion panel of comparative example 2 is set to 1.0.

Further, after luminance measurement, CaF formation amount of the fluorescent layer of a radiographic image conversion panel of example 9 was analyzed by use of ion chromatography to be 11 ppm, wherein "ppm" used in the present invention represents "ppm by mole" unless otherwise specified. The CsF formation amount is also shown in table 2.

TABLE 2

| Radiographic image conversion panel | TlI (mol %) | Treatment temperature (° C.) | Luminance | CsF formation amount (ppm) |
|---|---|---|---|---|
| Example 9 | 0.3 | 70 | 1.2 | 11 |
| Example 10 | 0.3 | 80 | 1.9 | 20 |
| Example 11 | 0.3 | 100 | 2.2 | 40 |
| Example 12 | 0.3 | 150 | 2.5 | 100 |
| Example 13 | 0.3 | 200 | 2.5 | 156 |
| Example 14 | 0.3 | 250 | 2.6 | 178 |
| Comparative example 2 | 0.3 | none | 1.0 | 0 |

Example 10

A radiographic image conversion panel having been treated with a fluorine-containing gas was prepared in a similar manner to example 9 except that the heating temperature was set to 80° C. in preparation of a radiographic image conversion panel having been treated with fluorine-containing gas. The prepared radiographic image conversion panel having been treated with a fluorine-containing gas was designated as a radiographic image conversion panel of example 10, an emission luminance and a CsF formation amount of which were measured in a similar manner to example 9. The emission luminance of a radiographic image conversion panel of example 10 was 1.9 and the CsF formation amount was 20 ppm. These measurement results are shown in table 2.

Example 11

A radiographic image conversion panel having been treated with a fluorine-containing gas was prepared in a similar manner to example 9 except that the heating temperature was set to 100° C. in preparation of a radiographic image conversion panel having been treated with fluorine-containing gas. The prepared radiographic image conversion panel having been treated with a fluorine-containing gas was designated as a radiographic image conversion panel of example 11, an emission luminance and a CsF formation amount of which were measured in a similar manner to example 9. The emission luminance of a radiographic image conversion panel of example 11 was 2.2 and the CsF formation amount was 40 ppm. These measurement results are shown in table 2.

Example 12

A radiographic image conversion panel having been treated with a fluorine-containing gas was prepared in a similar manner to example 9 except that the heating temperature was set to 150° C. in preparation of a radiographic image conversion panel having been treated with fluorine-containing gas. The prepared radiographic image conversion panel having been treated with a fluorine-containing gas was designated as a radiographic image conversion panel of example 12, an emission luminance and a CsF formation amount of which were measured in a similar manner to example 9. The emission luminance of a radiographic image conversion panel of example 12 was 2.5 and the CsF formation amount was 100 ppm. These measurement results are shown in table 2.

Example 13

A radiographic image conversion panel having been treated with a fluorine-containing gas was prepared in a similar manner to example 9 except that the heating temperature was set to 200° C. in preparation of a radiographic image conversion panel having been treated with fluorine-containing gas. The prepared radiographic image conversion panel having been treated with a fluorine-containing gas was designated as a radiographic image conversion panel of example 13, an emission luminance and a CsF formation amount of which were measured in a similar manner to example 9. The emission luminance of a radiographic image conversion panel of example 13 was 2.5 and the CsF formation amount was 156 ppm. These measurement results are shown in table 2.

Example 14

A radiographic image conversion panel having been treated with a fluorine-containing gas was prepared in a similar manner to example 9 except that the heating temperature was set to 250° C. in preparation of a radiographic image conversion panel having been treated with fluorine-containing gas. The prepared radiographic image conversion panel having been treated with a fluorine-containing gas was designated as a radiographic image conversion panel of example 14, an emission luminance and a CsF formation amount of which were measured in a similar manner to example 9. The emission luminance of a radiographic image conversion panel of example 14 was 2.6 and the CsF formation amount was 178 ppm. These measurement results are shown in table 2.

Comparative Example 2

A radiographic image conversion panel of comparative example 2 was prepared in a similar manner to example 1, except that a vacuum evaporation source material was prepared without mixing any CsF.

Thereafter, the obtained radiographic image conversion panel was sealed in a closed vessel having a content of 6 L to be subjected to a heat treatment at 70° C. Then, after the vessel was evacuated by opening a valve attached to the vessel while the temperature was kept, and spontaneous cooling was performed to obtain a radiographic image conversion panel without a fluorine-containing gas treatment. The obtained radiographic image conversion panel without a fluorine-containing gas was designated as a radiographic image conversion panel of comparative example 2, an emission luminance and a CsF formation amount of which were measured. The CsF formation amount of the fluorescent layer of a radiographic image conversion panel of comparative example 2 was not more than a detectable level. The measurement results are shown in table 2.

What is claimed is:

1. A scintillator plate for radiation comprising a substrate having thereon a fluorescent layer, said fluorescent layer comprising columnar crystals of a fluorescent material; wherein CsF crystals are formed on surfaces of the columnar crystals.

2. The scintillator plate of claim 1, wherein the fluorescent layer comprises CsI—CsF mixed crystals.

3. The scintillator plate of claim 1, wherein the CsI—CsF mixed crystals are formed by a method comprising the steps of:
   preparing a CsI—CsF mixture by mixing CsI crystals and CsF crystals; and
   forming the CsI—CsF mixed crystals via vacuum evaporation using the CsI—CsF mixture as a first source and an activator as a second source.

4. The scintillator plate of claim 1, wherein the fluorescent layer is formed by a method comprising the steps of:
   forming CsI columnar crystals via vacuum evaporation using CsI a first source and an activator as a second source; and
   forming CsF crystals on surfaces of the columnar crystals.

5. The scintillator plate of claim 4, wherein the CsF crystals were formed by heating the CsI columnar crystals in an atmosphere of a fluorine-containing solvent gas.

6. The scintillator plate of claim 5, wherein
   the fluorine-containing solvent gas is formed by evaporating a fluorine-containing solvent; and
   the fluorine-containing solvent is represented by Formula (1)

$$(R1\text{-}O)_a\text{-}R2 \qquad \text{Formula (1)}$$

wherein "a" represents integer of 1 to 3; R1 and R2 each is an alkyl group or an aryl group; and R1 or R2 comprises a fluorine atom and a hydrogen atom.

7. The scintillator plate of claim 1, wherein
   the fluorescent layer further comprises an activator; and
   the activator is a compound comprising one of the elements selected from the group consisting of iridium, thallium, potassium, rubidium, sodium and europium.

8. The scintillator plate of claim 1, wherein the fluorescent layer comprises CsBr—CsF mixed crystals.

9. A radiographic image detector comprising the scintillator plate of claim 1 and an output board which converts light emitted from the scintillator plate into an electric signal.

10. A scintillator plate for radiation comprising
    a substrate having thereon a fluorescent layer, wherein the fluorescent layer comprises columnar crystals of a fluorescent material comprising CsI and an activator; and CsF crystals are formed on the surface of the columnar crystals.

* * * * *